United States Patent [19]

Richter et al.

[11] Patent Number: 4,915,921

[45] Date of Patent: Apr. 10, 1990

[54] METHOD FOR THE REMOVAL OF SULFUR OXIDE AND NITROGEN OXIDE FROM EXHAUST GASES

[75] Inventors: Ekkehard Richter; Karl Knoblauch; Hans-Jürgen Schmidt, all of Essen, Fed. Rep. of Germany

[73] Assignee: Bergwerksverband GmbH, Essen, Fed. Rep. of Germany

[21] Appl. No.: 560,420

[22] Filed: Dec. 12, 1983

Related U.S. Application Data

[63] Continuation-in-part of Ser. No. 307,315, Sep. 30, 1981, abandoned.

[30] Foreign Application Priority Data

Oct. 18, 1980 [DE] Fed. Rep. of Germany ....... 3039477
Jan. 15, 1981 [DE] Fed. Rep. of Germany ....... 3101053

[51] Int. Cl.$^4$ ........................ B01J 8/00; C01B 21/00; C01B 17/00
[52] U.S. Cl. .................................... 423/239; 423/244
[58] Field of Search ................... 423/235, 235 D, 239, 423/239 A, 244 R

[56] References Cited

U.S. PATENT DOCUMENTS

| | | | |
|---|---|---|---|
| 4,272,497 | 6/1981 | Takahashi et al. | 423/239 |
| 4,400,363 | 8/1983 | Grochowski et al. | 423/239 |
| 4,500,501 | 2/1985 | Hamada et al. | 423/235 |

FOREIGN PATENT DOCUMENTS 2911712 9/1980 Fed. Rep. of Germany ...... 423/239

Primary Examiner—Gregory A. Heller
Attorney, Agent, or Firm—Michael J. Striker

[57] ABSTRACT

Method and apparatus for the removal of sulfur oxides and nitrogen oxides from exhaust gas with the addition of gaseous ammonia at temperatures between 110° and 180° C. The exhaust gas is led across carbon-containing adsorption agent flowing downwardly within a reactor, a portion of sulfur oxide initially being adsorptively removed in a upper part of a travelling bed, with nitrogen oxide catalytically reduced to nitrogen as well as further sulfur oxide being separated in a lower part of the travelling bed. Unloaded adsorption agent is delivered to the upper bed part, partially loaded adsorption agent is removed from that bed part and delivered to the lower bed part without mingling, loaded adsorption agent is removed from the lower bed part and led to a regeneration, after which it is delivered to the upper bed part.

14 Claims, 1 Drawing Sheet

METHOD FOR THE REMOVAL OF SULFUR OXIDE AND NITROGEN OXIDE FROM EXHAUST GASES

CROSS-REFERENCE TO RELATED APPLICATIONS

The present application is a continuation-in-part of the copending application Ser. No. 307,715, filed Sept. 30, 1981 now abandoned.

BACKGROUND OF THE INVENTION

The invention concerns a method and apparatus for the removal of sulfur oxides and nitrogen oxides from exhaust gases with addition of gaseous ammonia at temperatures between about 110 and 180° C., in which the exhaust gas is led across a bed of particulated carbon-containing adsorption agent travelling through a reactor interior from above to below. In a first travelling bed a portion of the sulfur oxide is initially adsorptively removed and in a second travelling bed the nitrogen oxide is reduced catalytically to nitrogen as well as separating further sulfur oxide. The exhaust gases are generally exhausts from furnaces and they contain as a rule also oxygen and steam. The carbon-containing adsorption agent can be present with or without introduced catalysts. The sulfur oxide adsorptively removed in the first travelling bed constitutes generally a large portion of the entire sulfur oxide present in the exhaust gas. The addition of gaseous ammonia has to be for the second travelling bed, where the catalytic reduction of nitrogen oxide to nitrogen is desired.

The sulfur oxide in the exhausts from furnaces are present in the form of sulfur dioxide and the nitrogen oxide in the form of nitrogen monoxide.

Dry, single-stage methods for the simultaneous removal of sulfur oxides and nitrogen oxides are known, in which ammonia is blown into the exhaust gas, whereafter the nitrogen oxide is catalytically reduced upon porous contact, forming nitrogen and steam, and the sulfur oxide is separated as ammonium sulfate or ammonium hydrogen sulfate.

Methods with active coal as adsorption agent-/catalyst have been described for temperatures from 180 to 230° C. (German Offenlegungsschrift DE-OS 24 33 076), as well as such with metal oxides of aluminum- or silicon-carrier material at temperatures between 200° and 250° (Japan Textile News, 1976, pages 84–87).

At temperatures below 250° C., both sulfur dioxide and nitrogen oxide react with ammonia, whereby to the extent that $NO_x$ and $SO_2$ are present in similar concentrations, at higher temperatures the reaction of $NO_x$ with $NH_3$, and at lower temperatures the reaction of $SO_2$ with $NH_3$ becomes favored. A disadvantage of these known methods is an increased ammonia consumption through reaction with surface oxides or oxygen. Beyond that there occurs as a rule greater loss of carbon with the activated coal.

A further disadvantage of the one-stage method is that with coal or oil-fired combustion chambers beyond the air pre-heater and electrofilter are found exhaust gas temperatures which lie only about 50° C. below the operational temperature of the known simultaneous methods. For that reason either a chamber modification connected with loss of degree of efficiency or a heating up of the exhaust before the removal of sulfur oxides and nitrogen oxides is necessary.

The mentioned problems will be decreased to a sure extent through a two-stage manner of operation. Therewith the first stage, e.g. a bed of adsorption agent travelling from above to below (travelling bed) serves primarily for the adsorptive removal of sulfur oxides, whereas in a second, very similar to the first, travelling bed, above all the catalytic reduction of nitrogen oxide into nitrogen in the presence of gaseous ammonia ensues.

With such a method, considerable amounts of adsorption agent per unit of time will be led through the regeneration stage customary in such cases, which has to result in a high apparatus expenditure and wearing out of adsorption agent.

Moreover, it turns out that a simultaneous removal of $SO_2$ and $NO_x$, under addition of ammonia, indeed follows extensively in favor of $SO_2$; however, with respect to NO, a removal of no more than 50–60% of the $NO_x$ component of the exhaust gas will be obtained, insofar as one holds the addition of ammonia within limits that are necessary in order to avoid an impermissibly high dosing of ammonia in the treated exhaust.

SUMMARY OF THE INVENTION

It is therefore the object of the invention to increase the effectiveness of the removal of sulfur oxides and nitrogen oxides in a method of the type described above, to decrease the circulation of adsorption agent through a regeneration stage as well as to obtain a considerably improved removal of $NO_x$ while maintaining the nearly complete $SO_2$ separation along with avoiding impermissibly high ammonia components in the treated exhaust gas.

A further object of the invention is to provide for suitable apparatus for such a method.

These objects are provided with a method of the type according to the art by delivering unloaded adsorption agent to the upper part of one combined travelling bed consisting of two successive parts, an upper part and a lower part, removing partially loaded adsorption agent from the upper part of the travelling bed and delivering it to the lower part of the travelling bed, separating loaded adsorption agent from the lower part of the travelling bed and introducing it to a regeneration stage as well as again delivering regenerated adsorption agent to the upper part of the travelling bed, and, with respect to an apparatus for the accomplishment of this method, through the features of one combined travelling bed consisting of two successive parts, upper and lower, disposed with an inlet for unloaded adsorption agent at the top end and an outlet for loaded adsorption agent at the bottom end as well as a connecting organ for the transport of partially loaded adsorption agent from the upper part to the lower part of the travelling bed;

exhaust gas entry, connecting and discharge conduits and known arrangement for the addition of ammonia.

Further improvements and favored provisions are, for the method, that the removal and delivery from the upper part to the lower part of the travelling bed follows without mingling of the granulated adsorption agent, at least with regard to the direction of flow of the exhaust gas, and the exhaust gas initially flows through the upper part of the travelling bed with unloaded adsorption agent in a first direction and then through the lower part of the travelling bed with partially loaded adsorption agent in a second direction, opposite to the first direction;

that the ammonia is delivered to the exhaust gas in excess relative to the amount of nitrogen oxides to be converted;

that the ammonia is delivered to the exhaust gas in deficiency relative to the reaction of $SO_2$ and $NH_3$ into ammonium salts, before the upper part of the travelling bed, with regard to the flow of exhaust gas;

that the dwell time of the granulated adsorption agent is different in both parts of the travelling bed; and that the dwell time of the exhaust gas is different in both travelling bed parts and for the apparatus, that the connecting organ is a connecting chute in the form of a shaft;

that the connecting chute is adapted at its top and bottom ends to the corresponding cross-sectional areas of both travelling bed parts;

that the depth of both travelling bed parts in the direction of flow of the exhaust gas is different;

that the flow cross section transverse to the direction of flow of the exhaust gas is different for both travelling bed parts;

that it allows the exhaust gas to be treated to be led across the through two parts of a travelling bed lying in succession and travelling from above to below, characterized by a gas-permeable separating element transverse to the direction of flow of the exhaust gas between both parts of the bed of adsorption agent a single exhaust gas permeable opening in the separating element;

at least one forced-mixing arrangement for ammonia and exhaust gas within the separating element; and at least one force-mixing arrangement in the direction of flow of the exhaust gas before the separating element.

The ammonia can be dosed into the gas stream before the upper part or before the lower part of the travelling bed. It is also possible according to the invention to dose the ammonia into the gas stream before both parts of the travelling bed. In this manner, a very fine increase in the removal of sulfur oxides and nitrogen oxides in each of both parts of the travelling bed is possible. Thus, for example, will the adsorption performance of the adsorption agent be favorably influenced relative to the removal of sulfur oxides when ammonia is provided before the upper part of the travelling bed. When the dosing of ammonia is only to the lower part of the travelling bed, strong limitation in the consumption of ammonia with simultaneously very exceptional removal of nitrogen oxides are possible. The dosing of ammonia before each of both travelling bed parts makes it possible to control the processes taking place in each of both parts particularly effectively.

The method according to the invention thus opens the possibility of in addition to the removal of sulfur oxides also being able to accomplish the reduction of nitrogen oxides at lower temperatures with high degree of conversion, and for which in both travelling bed parts carbon-containing adsorption agent can be used. According to the invention 20–80% of the sulfur oxide is removed in the upper part of the travelling bed.

The addition of the gaseous ammonia can follow with different or similar distribution across the entire height of the travelling bed or bed parts concerned, and it can also be undertaken in the conduit or conduits leading to the individual travelling bed parts. It is particularly favorable according to the present invention to introduce a forced mixing of ammonia with the exhaust gas before the respective travelling bed part. It has been discovered in namely surprising manner that the effectiveness of the method depends very strongly on a good distribution of ammonia into the exhaust gas stream. This is even more significant when ammonia is dosed between both parts of the travelling bed. According to the invention one can introduce the ammonia into the exhaust gas in the direction of flow of the exhaust gas in one or several places.

The regeneration of the loaded adsorption agent separated from the lower part of the travelling bed can follow in known manner, for example, through washing or heating.

Both travelling bed parts may display different volumes and the adsorption agent may be separated from both. According to the invention one removes the adsorption agent from the upper part of the travelling bed after a dwell time between about 20 and 200 h, preferably between 20 and 150 h, and from the lower part of the travelling bed after a dwell time between 20 and 300 h, preferably between 20 and 200 h.

The effectiveness of the carbon-containing adsorption agent can be improved according to the present invention with regard to the $SO_2$-removal and the $NO_x$-reduction when one uses between 0.05 and 5% by weight of the elements copper, iron, lithium, sodium, aluminium, barium and vanadium brought in individually or in combination.

The partial removal of sulfur oxide in the upper part of the travelling bed can follow with a higher space velocity than with a complete removal in a one-stage manner of operation. According to the present invention, the exhaust gas is therefore led into the upper part of the travelling bed with the adsorption agent at a space velocity between about 200 and 5,000/h, preferably with a space velocity from 400 to 1,800/h.

An increase in the $NO_x$-separation can be obtained according to a further construction of the invention through the superposition of travelling beds. Concerning a gas flowing across travelling beds of loose material in a reactor customary for this, as is here the case, it will be characteristic that the loose granules—here granules of adsorption agent—become displaced only insubstantially with regard to their relative position to each other upon travelling through the reactor, i.e., mainly, the loose granulate particles which upon entry into the travelling bed reactor come to lie in the nearest stream of flowing gas, remaining in this transverse direction to the gas stream during their entire dwell time in the reactor, which naturally occurs for all other granules with regard to their formerly prejudiced transverse direction to the stream of gas. Such a formerly prejudiced arrangement of the granules in the upper part of the travelling bed should then not alter according to the invention in the lower part of the travelling bed, at least with regard to the direction of flow of the exhaust gas. To accomplish this, the transport of adsorption agent form the one to the other travelling bed parts has to follow carefully. Beyond that the exhaust gas stream must flow initially according to the invention in one direction in the travelling bed part filled with unload adsorption agent and subsequently flow in a direction opposite to the first direction in the travelling bed part filled with partially loaded adsorption agent, i.e., the layers of adsorption agent, which transverse to the direction of gas flow are first washed about by exhaust gas in the upper part of the travelling bed are reached later as the last by the exhaust gas flowing into the lower part of the travelling bed.

Correspondingly, the exhaust gas goes into the other layers of adsorption agent so that e.g. the last layer transverse to the direction of gas flow in the upper part of the travelling bed subsequently becomes the first in the lower part of the travelling bed to be washed about thereby. This procedure in surprising manner effects a substantial improvement in the $NO_x$-separation compared to the state of the art, while simultaneously obtaining a fast, complete $SO_2$-separation.

The method according to the present invention surprisingly bears a considerable amount of ammonia dosing, besides leaving ammonia in nominal extent in the lower part of the travelling bed, together with the treated exhaust gas. Accordingly, it is suggested to deliver ammonia to the exhaust gas being treated in excess relative to the amount of nitrogen oxides to be converted. Therewith the addition of ammonia should lie within the limits between 1 to 2.5 times the stoichiometrically necessary amount of ammonia, relative to $NO_x$. An ammonia addition of about 1.5 times the stoichiometrically necessary amount is preferred.

It turns out that the consumption of ammonia may be limited advantageously even with the addition of an excess with regard to the amount of nitrogen oxide to be converted with regard to the amount of nitrogen oxide to be converted when the exhaust gas has ammonia delivered to it in deficiency with regard to the reaction of $SO_2$ with $NH_3$ into ammonium salts before the upper part of the travelling bed relative to the direction of flow of the exhaust gas. Therewith this deficiency can lie within the limits between 0.2 to 0.8 times the stoichiometrically required amount of $NH_3$, relative to the reaction with $SO_2$, with an ammonia addition of about 0.2 times preferred.

Not only with regard to the quantity of the portion of adsorption agent to be dealt with in an adsorption-regeneration circulation per unit time, but also with regard to an optimal accommodation of the method to the composition of the exhaust gas and the requisite degree of removal of $SO_2$ and $NO_x$, it is of advantage when according to the invention the dwell time of the granules of adsorption agent is different in both travelling bed parts. The dwell time in the lower part of the bed should amount to about 0.5 to 3 times the dwell time in the upper part of the travelling bed, with about 1.5 times preferred. It is also possible in order to obtain the mentioned objective to have the dwell times of the exhaust gas different in both travelling bed parts.

The apparatus for the accomplishment of the method according to the invention involves a particular arrangement of the known transverse flowable travelling bed reactors as have already in principle been described among others in German Offenlegungsschrift DE-OS 26 26 939. Apart from somewhat limitations it can be controlled in known manner with the input for unloaded adsorption agent at the upper end, i.e. in the top area of the upper part of the travelling bed reactor; the same goes for the output for loaded adsorption agent at the bottomest end, thus at the lower area of the lower part of the travelling bed reactor. The necessary connecting organ for the transport of partially loaded adsorption agent from the upper to the lower travelling bed parts may in principle be of very many forms, to the extent that an intermediate bunker between the upper and the lower travelling bed parts is considered. The exhaust gas input, connecting and output conduits as well as the arrangements for the addition of ammonia may be realized in known manner according to the state of the art.

It has been shown to be particularly advantageous and favorable to have a connecting organ which is composed of a single connecting chute in the form of a shaft between the two travelling bed parts. Therewith this connecting chute is disposed as best as practical precisely vertical, to decrease the wearing out of adsorption agent. It is particularly advantageous to have such a connecting chute adapted at its upper and lower ends to the corresponding surface cross sections of both travelling bed parts. At its upper end, the chute is adapted to the bottom cross section of the upper travelling bed part and at its lower end to the top cross section of the lower travelling bed part. In this manner, a mingling of the granules of adsorption agent not only in a horizontal but also in a vertical direction is extensively avoided and a particularly high effectiveness with regard to $NO_x$-removal is obtained.

Different dwell time for the granules of adsorption agent and/or the exhaust gas in the travelling bed are obtained according to the invention by having the depth of both travelling bed parts different in the direction of flow of the exhaust gas. This may also be attained by differing the in-flow cross section of both travelling bed parts, thus transverse to the direction of flow of the exhaust gas, which may be obtained through different heights as well as different width for both travelling bed parts.

The heights, widths and depths of both travelling bed parts are selected according to the composition of exhaust gas to be purified in the chosen adsorption agent, as well as the degree of purification to be obtained, and can be ascertained by general expertise and if necessary through supplementary tests be determined. Typical magnitudes for an exhaust gas stream of e.g. 100,000 $m^3/h$ with $SO_2$-loading of 800 ppm and $NO_x$- loading of 600 ppm as well as degree of purification relative to $SO_2$ of 98% and relative to NO of 85% are obtained for both travelling bed parts with for example 12.00 m×7.70m×1.20 m (height×width×depth) for the upper part of the travelling bed reactor and 13.00 m×7.70 m×1.40m for the lower part of the travelling bed reactor. Dwell times for the individual granules of an adsorption agent amount to form bout 55 to 66 h and for the exhaust gas from about 4 or 5 s in the upper part or lower part of the travelling bed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
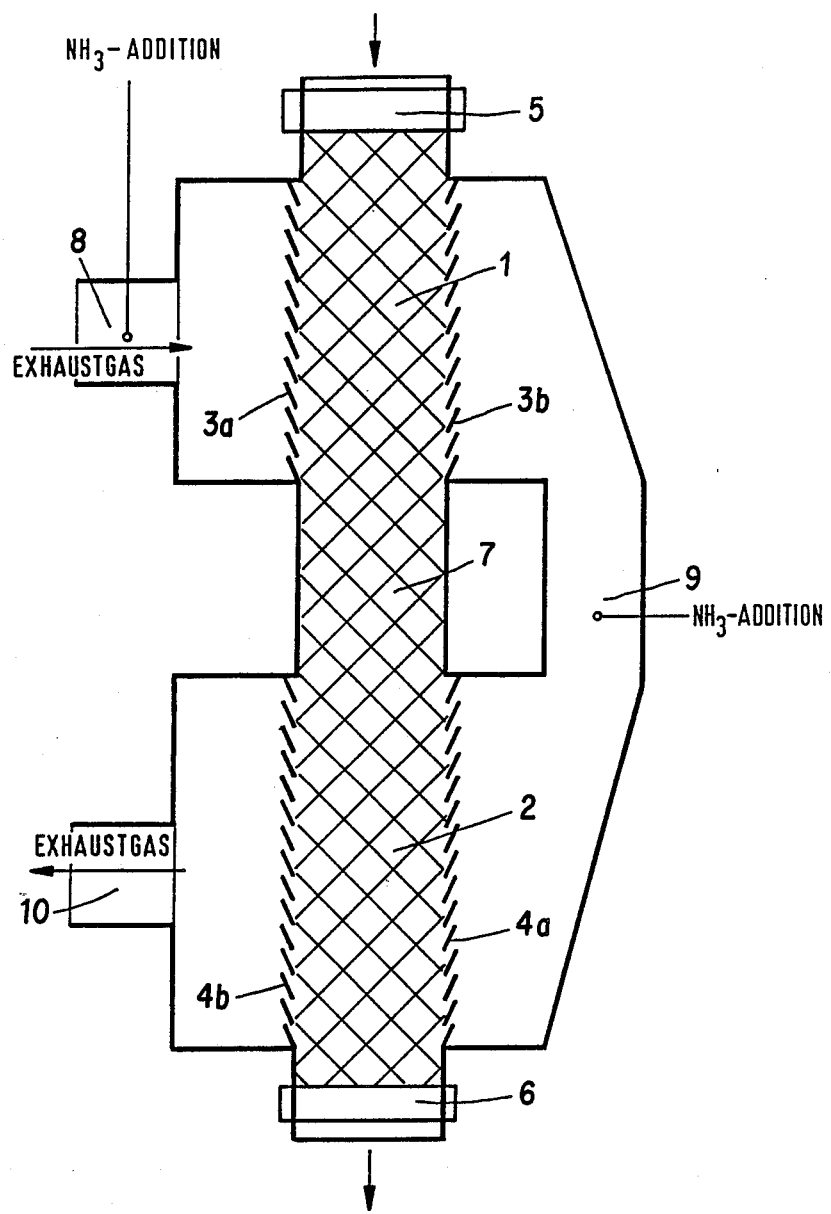
FIG. 1 is a schematic representation of an apparatus for the accomplishment of the method according to the invention, using combined travelling bed reactors with two successive parts.

FIG. 1 shows schematically in section a combined travelling bed reactor with two successive parts. The upper travelling bed part is designated with 1 and the lower with 2. The known Venetian blind or similar type walls 3a, b, resp. 4a, b limit both travelling bed parts at their front and back sides with regard to the direction of flow of the exhaust gas. An itself known input arrangement 5, e.g. a double cover sluice, is disposed at the upper end of the upper part of the travelling bed reactor for delivery of unloaded adsorption agent, whereas the likewise itself known drainage arrangement 6 for loaded adsorption agent is provided at the lowermost end of the lower part of the travelling bed reactor 2. A connecting organ 7 between both travelling bed reactor parts 1 and 2 serves for the transport of partially loaded adsorption agent from the upper to the lower travelling bed parts; this may be e.g. a connecting chute in the form of a shaft which can be vertically arranged as in FIG. 1. An exhaust gas entry conduit 8 provides the upper part of the travelling bed reactor with the exhaust gas to be purified, which is led after streaming through the travelling bed cross connecting conduit 9 into the lower part of the travelling bed reactor and then leaves across exit conduit 10. As in FIG. 1 the direction of streaming through both consecutive travelling bed parts may be opposite.

The connecting chute (connecting organ 7) represented in FIG. 1 displays at its upper and lower ends of the same free cross-sectional surfaces in the direction of travel as the travelling bed parts to be fitted. The depth of both travelling bed parts is depicted as being the same.

EXAMPLE I

As carbon-containing adsorption agent a treatment-typical activated coal is used having specific surface of 500 m$^2$/g (determined according to the Brunauer, Emmett and Teller). In the upper part of a combined travelling bed in accordance with FIG. 1 are 1.8 m$^3$ of the adsorber. The travelling bed displays a crosssectional surface transverse to the direction of flow of the exhaust gas of 2.0 m$^3$, with a bed height of 2.0 m, and a bed depth of 0.9 m. 1.6 m$^3$ of the activated coal are located in the lower part of the combined travelling bed. With a cross-sectional surface of 2.0 m$^3$ transverse to the direction of flow and a bed height of 2.0 m, the bed depth amounts to 01.8 mm.

At a temperature of 120° C., 1,500 m$^3$/h combustion plant exhaust gas containing 0.08% by volume $NO_x$, 0.1% volume $SO_2$, 6.4% by volume $O_2$ and 9.7% by volume $H_2O$ and having a space velocity (relative to the vacant adsorber) of 800 h$^{-1}$ (reckoned at normal temperature) are led through the upper part of the travelling bed. The exhaust gas is so dosed with ammonia before the upper part of the travelling bed that a $NH_3$-concentration of 0.02% by volume is present there. In the upper part of the travelling bed there follows a decrease of the $SO_2$ concentration of the exhaust gas to 0.018% by volume (82% degree of desulfurization) with an activated coal dwell time of 70 h in this bed. The $NO_x$-concentration is decreased to 0.07% by volume. Ammonia gas is added into the exhaust before the lower part of the travelling bed in an amount necessary to produce an $NH_3$-concentration of 0.1% by volume in that bed. Then at a space velocity of 900 h$^{-1}$ (reckoned at normal temperature) and an activated coal dwell time of 62 h in the lower part of the travelling bed, the $SO_2$-concentration is lowered to 0.003% by volume and the $NO_x$-concentration to 0.014% by volume.

Collectively 97% of the $SO_2$ and 81% of the $NO_x$ are removed in both parts of the combined travelling bed.

While the invention has been illustrated and described as embodied in a method and apparatus for the removal of sulfur oxide and nitrogen oxide from exhaust gases, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Method for the removal of sulfur oxides and nitrogen oxides from exhaust gas with the addition of gaseous ammonia at temperatures between about 110° and 180° C, in which the exhaust gas is led across through a layer of granulated, carbon-containing adsorption agent travelling from above to below in the interior of a reactor, a portion of the sulfur oxide is initially adsorptively removed in a first travelling bed, and the nitrogen as well as further sulfur oxide being separated in a second travelling bed, thereby characterized in that one combined travelling bed consisting of two successive parts is provided and that unloaded adsorption agent is delivered to the upper part of the travelling bed, partially loaded adsorption agent is removed from said upper part of the travelling bed and delivered to the lower part of said travelling bed, loaded adsorption agent is removed from said lower part of said travelling bed and led to a regeneration stage, and regenerated adsorption agent is delivered to said upper part of said travelling bed, said removal from the upper part and delivery to the lower part following without mingling of the granulated adsorption agent, at least with regard to the direction of flow of said exhaust gas, and said exhaust gas initially flowing through the upper part of the travelling bed with unloaded adsorption agent in the first direction and then through the lower part of the travelling bed with partially loaded adsorption agent in a second direction opposite to the first direction.

2. Method according to claim 1, further comprising dosing said ammonia into the gas stream of said lower part of the travelling bed.

3. Method according to claim 1, further comprising dosing said ammonia into the gas stream before both parts of the travelling bed.

4. Method according to claim 1, wherein said 20–80% of said sulfur oxide is removed in said upper part of the travelling bed.

5. Method according to claim 1, wherein said lower part of the travelling bed is operated in the presence of about 1.0 to 2.5 mol gaseous ammonia per mol of nitrogen oxides calculated as NO led into said lower part of the travelling bed.

6. Method according to claim 1, wherein said exhaust gas is introduced into said upper part of the travelling bed with said adsorption agent at a space velocity between about 200 and 5,000 h$^{-1}$.

7. Method according to claim 6, wherein said space velocity is from about 400 to 1,800 h$^{-1}$.

8. Method according to claim 1, further comprising introducing into said carbon-containing adsorption agent between about 0.05 and 5% by weight of the elements copper, iron, lithium, sodium, aluminum, barium or vanadium individually or in combination.

9. Method according to claim 1, wherein the adsorption agent is removed from said upper part of the travelling bed after a dwell time between about 20 and 200 h and from said lower part of the travelling bed after a dwell time between about 20 and 300 h.

10. Method according to claim 1, wherein a forced mixture of ammonia with said exhaust gas is effected before said lower part of the travelling bed.

11. Method according to claim 1, wherein said ammonia is introduced into said exhaust gas in the direction of flow of said exhaust gas in one or several places.

12. Method according to claim 11, wherein a small part of said ammonia is introduced into an upper area and a large part of said ammonia is introduced into a lower area of space before said lower part of the travelling bed.

13. Method according to claim 1, wherein said ammonia is introduced into said exhaust gas in the direction of flow of said exhaust gas in one or several places.

14. Method according to claim 1, wherein said ammonia is delivered to said exhaust gas before the upper part of the travelling bed, in an amount less relative to the reaction of $SO_2$ with $NH_3$ into ammonium salts.

* * * * *